Dec. 4, 1951  F. L. CLARK  2,577,182
ANIMAL TRAP
Filed Oct. 2, 1946

INVENTOR
Frank L. Clark

BY Young, Emery + Thompson
ATTORNEYS

UNITED STATES PATENT OFFICE 2,577,182

ANIMAL TRAP

Frank L. Clark, Upper Hutt, Wellington,
New Zealand

Application October 2, 1946, Serial No. 700,605
In New Zealand October 2, 1945

1 Claim. (Cl. 43—88)

This invention relates to an improved construction of animal trap suitable for use in trapping rabbits, opossums, rats and other animals, according to the sizes in which the traps are made.

The construction devised provides a trap that is light and compact in its formation, is quick acting and humane in its action, and in general, one that meets the desired requirements in respect of such an article.

In this invention the said construction embodies a pair of shaped jaws pivotally mounted side by side upon a base piece so as to be capable of opening downwardly and outwardly from each other and of closing together and spring controlled to be normally closed, characterized in that each jaw is made of round cross-sectional material and shaped with each of its side parts inclined from its pivotal point in towards the middle as it extends to a straight transverse bar part of the jaw; one jaw is made of about one half thickness of the round section shorter in height than the other jaw so that in the closing of the jaws, the straight bar part of the shorter jaw will engage slightly below the straight bar part of the other jaw.

The invention is concerned with features of construction in such a form of trap under which the aforesaid advantages are obtained.

In fully describing the invention, reference will be made to the accompanying drawings, in which—

Figure 1:
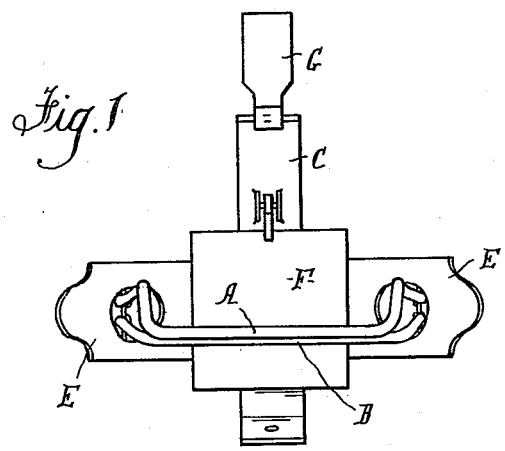
Figure 1 is a plan of the trap in the closed condition.
Figures 2, 4:
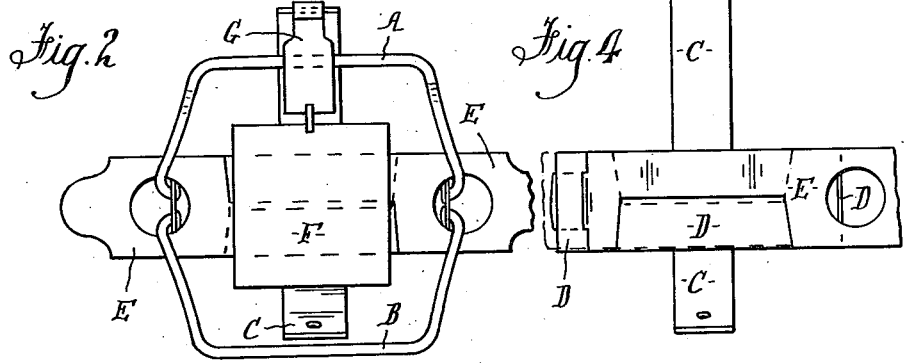
Figure 2 is a plan of it in the open or "set" condition.
Figure 4 is a plan of the trap frame showing one of the springs in full lines and the other in dotted lines.
Figures 3, 5:
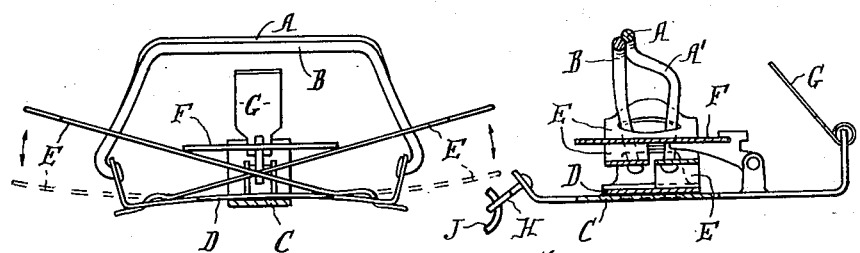
Figure 3 is a side elevation of Figure 1.
Figure 5 is a sectional end elevation of the closed trap.

According hereto the jaws A, B, are arranged to extend transversely at right angles across the base piece C of the trap which base piece is formed by a short length of metal strip of approved width. The said jaws A, B, are hinged or pivoted in the upwardly turned ends of a flat cross piece D secured to the base piece C so that they turn to open and close across the line of the base piece. Attached to the said cross piece D near each end is a flat spring E which extends across to near the other end and at such other end encircles the side members of the two bow shaped jaws A, B, at their corresponding ends. These springs E therefore cross each other and each is given a normal upward lift at its free end so that it acts to force the jaws upwardly together when in the normal position and to permit of them being opened out and turned down when the spring ends are forced down.

The trap therefore is designed to function by having its jaws A, B, opened through forcing the springs E down to close the jaws by the springs rising on the side members of the jaws in the manner characteristic of this class of trap. An important novel feature of the present invention, however, is concerned with the formation of the jaw side members and of the enclosing apertures in the springs and also the relative arrangement of the springs to ensure of the spring sliding freely over the jaw sides in its closing action so that the action is rapid and positive. For this purpose the said side members of the jaws on each side of the trap are made to incline from their pivotal points in towards the middle as they extend to their connection with top straight parts of the respective jaws. The said apertures thus in their movement of the springs slide freely over the side members in a radial movement. Also the jaws may be so pivoted to the cross piece ends as to aid in this effect. This arrangement will allow for the springs being of lighter nature thus helping to reduce the cost and weight of the trap, and also will result in a greater clearance between the opened jaw to ensure of a bait tray F of larger area being used and a more effective covering of the space between the jaws. This manner of mounting the springs and their relative arrangement also ensures that the bait tray is held closed to the level of the base so that when the trap is sprung the full height of the jaw is available for closing on an animal's leg.

In addition to these constructional features of the operations of the trap are improved by forming the jaws of round cross sectional material thus making these more humane in their action on the animal caught thereby.

Also the inclined side member of each jaw is made to curve laterally outward as it rises towards the top bar of the jaw and then is turned back to the plane of the jaw as it connects with such bar. This provides that when each jaw is turned out and down in the setting of the trap, legs A′ are formed at both ends of the jaw to engage and rest on the ground surface and thereby to provide a firm base for the whole area of the opened trap.

Further one jaw is made of about one half thickness of the round section shorter in height than the other jaw so that in the closing of the jaws the straight top bar part of the shorter jaw will be caused to engage tangentially with and below the straight top bar part of the other jaw. This provides that on further strain by a caught animal the shorter jaw will jam against the other jaw to effect greater locking engagement of the top bars.

The detent lever G and pivoted bait tray F used with this trap are of the usual design but these are mounted upon one end of the base piece C so as to engage the jaw A which opens to that end in the arrangement of the jaws transversely across the line of the base piece characteristic of this invention.

The swivel H for the attachment of the anchoring chain J is mounted on the other end of the base piece so that greater freedom of movement is allowed an animal caught within the trap, also a more unimpeded approach to the trap is provided for than with the jaws, spring and base piece extending in the same plane as has generally been customary hitherto.

I claim:

An animal trap of the character described comprising an elongated base forming member, an elongated cross piece mounted on the base member in a plane parallel to that containing the base member and with its longitudinal dimension perpendicular to that of the base member, jaw pivoting supports carried by the end portions of said cross piece, a pair of jaws pivotally mounted in said supports capable of opening out from each other and of closing together, each jaw including a straight outer member and two side arms extending from the ends of the straight member and inclined outwardly toward the pivot supports, said side arms of the two jaws at each end thereof being bent laterally outward from each other towards their upper portions and the straight outer parts of the two jaws being so disposed that one overlaps the other when the jaws are closed, a flat spring mounted near each end of the cross piece inwardly of the pivot support and extending upwardly and across the cross piece to the other end thereof, said springs having lateral cut out portions intermediate their ends to enable them to overlap each other so that the free end of each spring overlies the fixed end of the other spring, the end of each spring having an opening to receive the pivot support and the side arms of the jaws, and releasable trigger means carried by the base to retain said jaws in open position, the arms of the jaw being round in cross section.

FRANK L. CLARK.

REFERENCES CITED

The following references are of record in the file of this patent:

UNITED STATES PATENTS

| Number | Name | Date |
| --- | --- | --- |
| 49,174 | Thomas | Aug. 1, 1865 |
| 173,500 | Saladee | Feb. 15, 1876 |
| 188,753 | Pownall et al. | Mar. 27, 1877 |
| 1,692,158 | Cooper | Nov. 20, 1928 |
| 1,728,228 | Coe | Sept. 17, 1929 |
| 1,770,584 | Schott | July 15, 1930 |
| 2,042,728 | Neville | June 2, 1936 |
| 2,128,579 | Corey | Aug. 30, 1938 |